Nov. 12, 1957 E. KOLISCH 2,812,904
EQUIPMENT FOR RATING PACKAGES BY VARIOUS PARAMETERS
INCLUDING VOLUME, WEIGHT, DENSITY AND ZONE
Filed Aug. 18, 1951 3 Sheets-Sheet 1
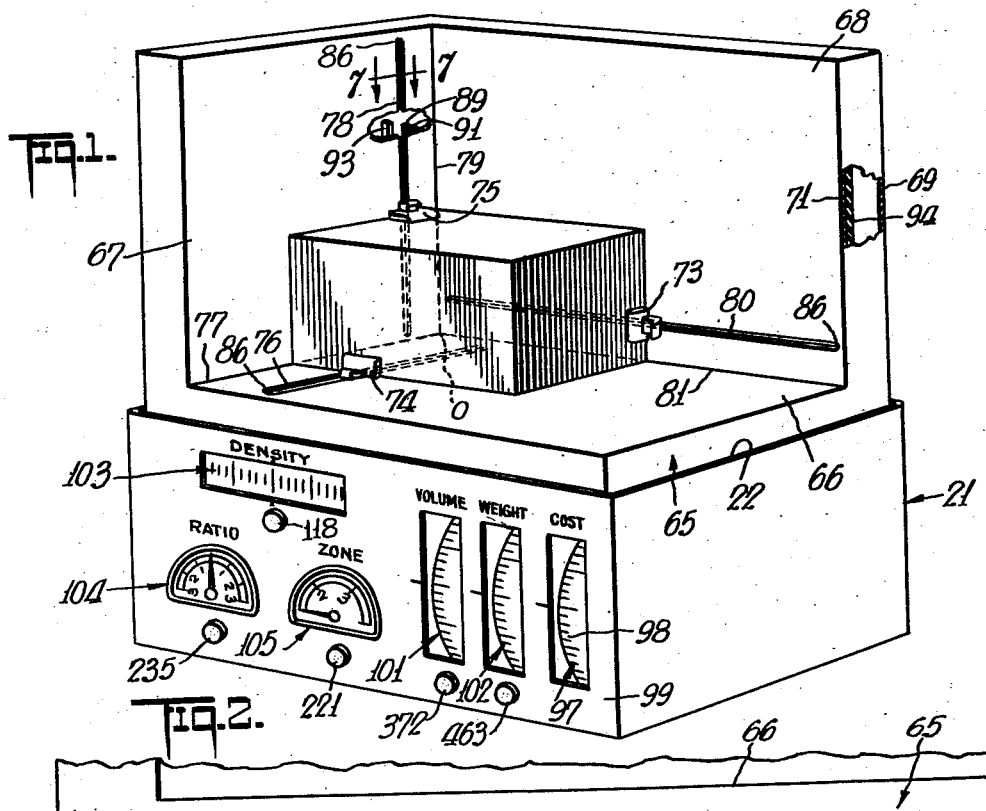
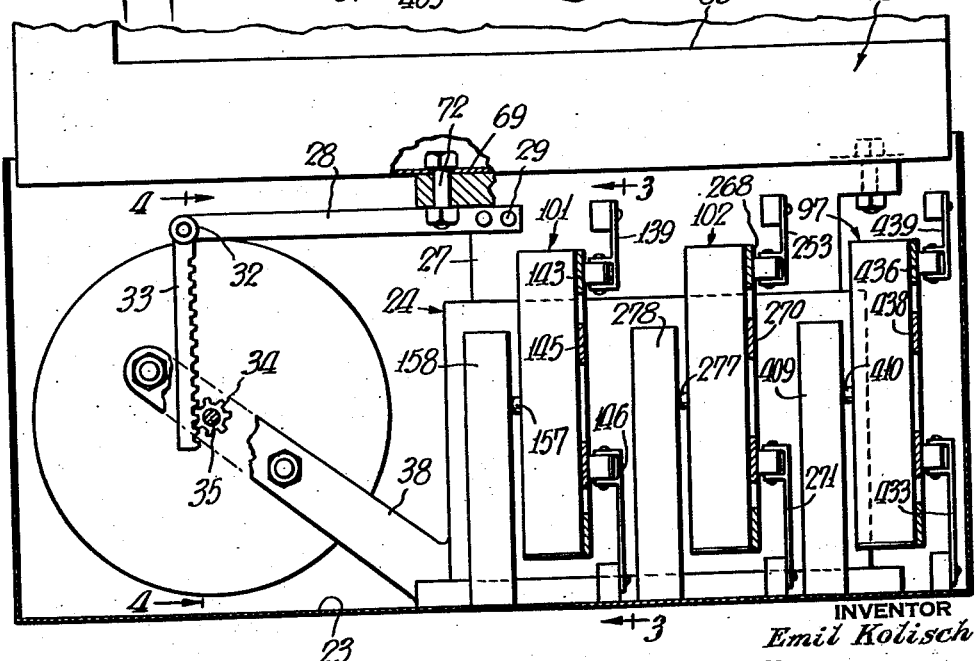
INVENTOR
Emil Kolisch
BY
Dean Fairbank & Hirsch
ATTORNEYS

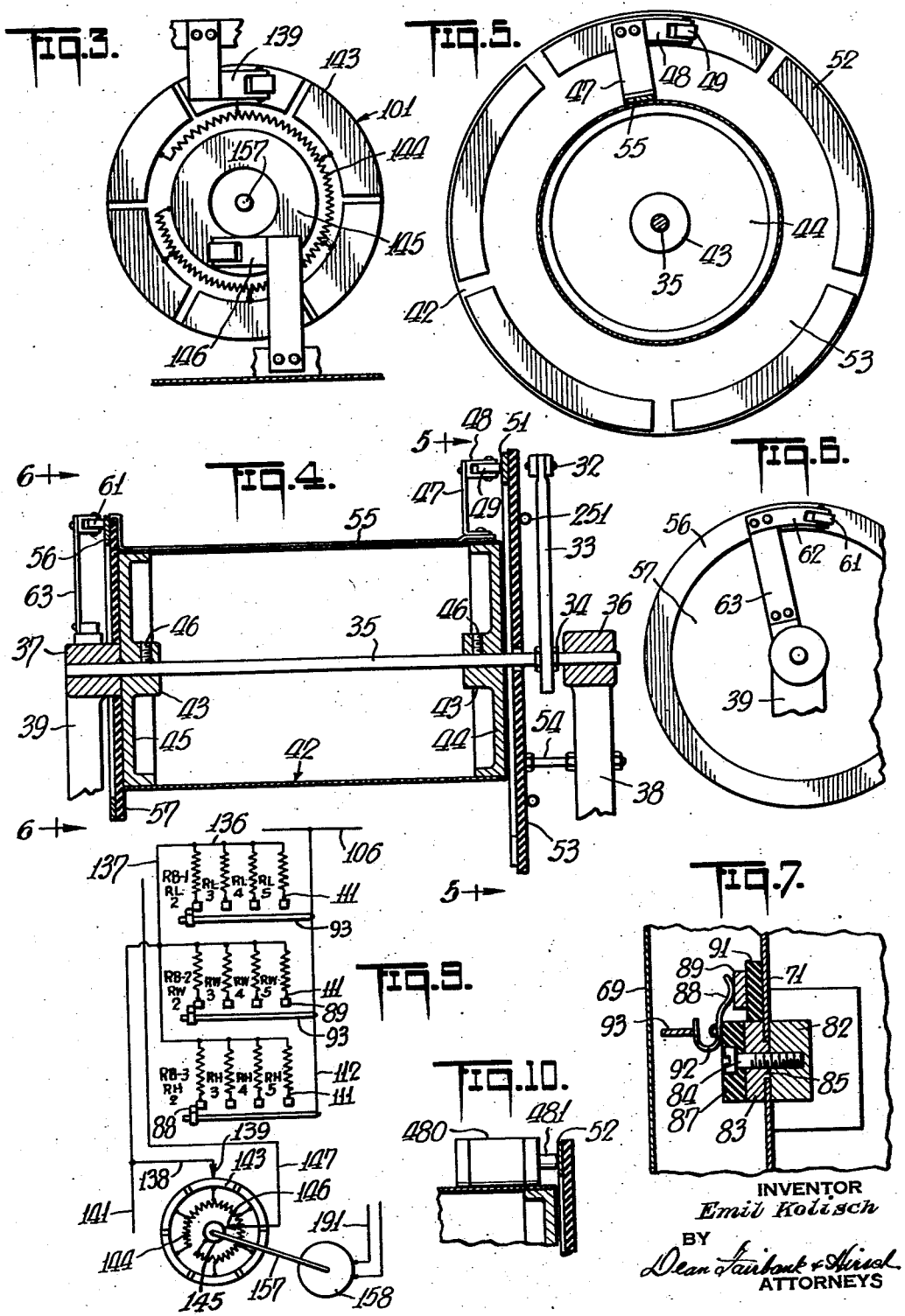

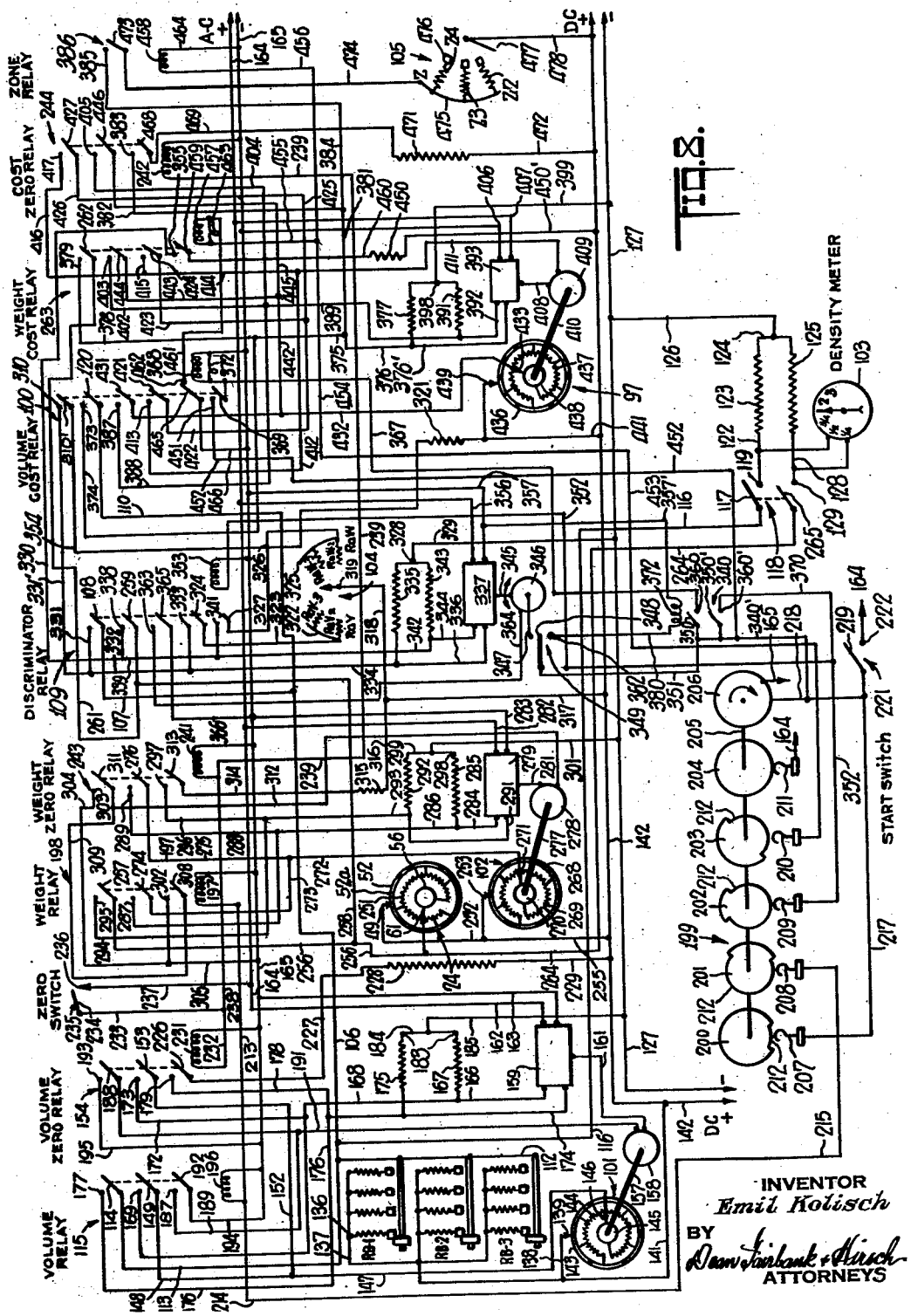

United States Patent Office 2,812,904
Patented Nov. 12, 1957

2,812,904

EQUIPMENT FOR RATING PACKAGES BY VARIOUS PARAMETERS INCLUDING VOLUME, WEIGHT, DENSITY AND ZONE

Emil Kolisch, New York, N. Y., assignor to Continental Electrolog Corp., a corporation of New York Application August 18, 1951, Serial No. 242,531

15 Claims. (Cl. 235—61)

In the rating of rectangular objects and packages, as for instance, for determining transportation charges by air express, post office, express, truck or other delivery service organizations, either the weight or the volume of the object or package may be the determining factor for the shipping charge. Ordinarily the weight of the object forms the basis for such charge, but where the object has a relatively large volume and a small weight, as for instance, boxed flowers, some transportation services base their charge on volume.

Where, in order to determine the shipping charge, an object must be measured by rule or tape and the length, width and height multiplied to determine volume, whether with or without resort to multiplication tables, and the weight of the object must be separately determined by placing it on a weighing scale and the two values compared in order to determine which is the proper basis of charge, such operations are time-consuming, costly and subject to error.

Where, to measure the length, width and height of an object, a plurality of parallel connected resistances of values correlated with the parameters being measured and designed to pass a combined current proportional to the logarithm of the volume of such object, are connected to feed such combined current into an electric indicating device such as a meter having a logarithmic scale which is calibrated to give a direct reading of volume or of cost based upon volume, it is extremely difficult to read the values of volume or cost at the crowded end of the logarithmic scale.

Where, for a given volume, a given weight is to have the same monetary rating and that relationship between volume and weight is proportionately maintained throughout the range of the equipment and a weighing scale is designed to place in circuit current limiting means or resistance correlated with the weight of the object, and the current through such resistance is fed into an electric indicating device such as a meter having a logarithmic scale which may be calibrated to read the cost or the weight of the object directly, such meter will be difficult to read as previously pointed out.

It is accordingly among the objects of the invention to provide a simple, expeditious and reliable method and equipment to execute the same, with relatively few moving parts not likely to become deranged and which may readily be operated, automatically, speedily and accurately to measure the volume of an object and as accurately to indicate such volume by means of an indicating device having a linear scale, with resultant facility in reading.

Another object is to provide a method and equipment of the above type, which may readily be operated automatically, speedily and accurately to measure the volume and the weight of an object and as accurately to indicate such parameters by means of an indicating device having a linear scale, with resultant facility in reading, said equipment automatically rating such objects according to volume or weight and (based on a predetermined relation of the volume and weight, which relation may be varied at will), automatically determining which of such ratings, whether for volume or for weight, will be the basis for shipment charge of such object and automatically and accurately indicating such charge also on a linear scale, without the need for manually measuring the object, consulting tables or doing calculations of any sort.

According to the invention, from its broader aspect, each of the three dimensions of length, width and height of the object is determined by the coaction with such object of suitable measuring means, which, through electrical circuits, automatically determines such parameters and the volume classification of such object. Simultaneously the weight classification of the object is determined by means of a suitable weighing scale on which the object may rest while determining the volume classification. The classifications simultaneously effected of volume and weight are automatically correlated, according to the invention, in such manner that within a given range of relationship between volume and weight, the weight controls the charge rating, desirably registered by a suitable indicating device, while outside of that range the basis of the charge rating is automatically shifted for volume to be the controlling parameter. In addition, such classifications of volume and weight may be automatically correlated to determine the ratio of the weight to the volume or the density of the object.

According to an illustrative embodiment of the invention, the volume measuring portion of the equipment desirably comprises a frame having a horizontal platform, an end wall and a rear wall, each having a slidable measuring member which may be moved to engage the extremities of the object to determine its maximum dimensions such as its width, height and length respectively. The weight measuring portion of the equipment desirably comprises a weighing scale associated with and carrying the frame so that an object placed on said platform simultaneously will have its dimensions and weight determined.

Each of the slidable members of the volume measuring portion of the equipment controls a switch which automatically places in circuit a current limiting means or resistance bank having a value correlated respectively with the three parameters being measured. By connecting the three resistance banks in parallel, the combined output therefrom will be equal to the sum of the currents therethrough. Each of the resistance banks is of such value that the current therethrough is proportional to the logarithm of the associated dimension of the object being measured. Consequently, the anti-logarithm of the sum of the currents through the three parallel connected resistance banks will be proportional to the volume of such object and a suitable indicating device controlled by such combined current is calibrated to indicate the volume of the object.

Simultaneously, with the determination of volume, the weighing scale is designed to place in circuit current limiting means or resistance correlated with the weight of the object. In one application in which the amount to be charged for the object being shipped is effected only by weight or only by volume, but in which the relation of weight to volume automatically determines the cost controlling factor, the current limiting means or resistances controlled by volume and those controlled by weight are so correlated that for corresponding numerical values in the volume sequence and the weight sequence, the currents passed thereby are equal. That is, for a given volume, a given weight is to have the same monetary rating and that relationship between volume and weight is proportionally maintained throughout the range of the equipment. To this end, a bank of resistances is controlled by the weighing scale and the magnitude of each resistance element in that bank is equal to the magnitude of the combined value of resistance of the parallel connected resistance banks which determine the corresponding volume rating and the current through the weight controlled resistances controls a suitable indicating device calibrated to indicate the weight of the object.

More specifically, the parallel connected volume resistance banks and the weight resistance bank each forms one arm of a pair of Wheatstone bridge circuits respectively, and the volume indicating device and weight indicating device each forms another arm of said Wheatstone bridge circuits respectively. Each indicating device illustratively comprises a drum having a linear scale thereon calibrated in units of volume and weight respectively. Each drum has a plurality of contact strips thereon to which are connected respectively, resistances of value such that for any given combined value of resistance in the parallel connected resistances and for any given value in the weight resistance, associated respectively with a given volume and a given weight, there is a corresponding value of resistance on each of the drums.

Each of the drums is driven by a suitable motor controlled by the output of the associated Wheatstone bridge. Thus, if the resistance in the indicating arms of the bridges should be equal to the resistance in the volume portion or weight portion of the respective bridges, the bridges will be in balance and no current will be fed to the associated motor to rotate the drum. Consequently, the latter will indicate a value correlated with the value of the drum resistance in circuit which will be equal to the volume or to the weight respectively, of the object.

If, however, the resistance in the indicating arms of the bridge should differ from the resistance in the volume or weight arms of the bridge, the bridge would be out of balance and current would flow to the associated motor thereby to rotate the drum. Such rotation would continue until the resistance of each of the indicating arms of the bridge is equal to that of the volume and weight arms respectively at which time the bridges will again be in balance and the motors will be de-energized. At such time the drums will indicate a value equal to the volume and weight of the object respectively.

Of the two currents (weight controlled and volume controlled) that which preponderates controls the cost indication which is desirably effected, in the embodiment herein shown, by a drum similar to the drums indicating volume and weight and also calibrated with a linear scale preferably in monetary units and in the preferred embodiment, when the currents are equal it is the weight current that controls the cost drum.

To effect such control, it is preferred to connect the parallel connected volume resistances and the weight resistance in a suitable discriminator circuit, also preferably a Wheatstone bridge, in which the volume resistances form one arm thereof and the weight resistance forms another arm thereof. A motor, similar to the motor driving the volume and weight drums, is fed by the output of such bridge and is actuated by predominance, say of volume controlled current, to shift the connection for feeding volume controlled current to the cost indicating device and the discriminator circuit is designed to feed weight controlled current to such cost indicating device at all other times. Desirably the cost indicating drum also has a plurality of contact strips thereon to which are connected respectively resistances of such value that for a given volume or a given weight, a resistance of predetermined value may be placed in circuit and the resistances on the cost drum form one of the arms of another bridge circuit in which either the parallel connected volume resistance, or the weight resistance form another arm.

The cost drum is driven by a suitable motor also similar to the motor driving the volume and weight drums and such motor is fed by the output of the cost bridge. Thus, if the value of the resistance controlled by the drum should be equal to the value of either the volume or weight resistance in the other arm of the cost bridge, such bridge will be in balance and no current will be fed to the motor to rotate the cost drum. Consequently the latter will indicate a charge correlated with the value of the drum resistance in circuit based upon the volume or weight of the object as the case may be. If, however, the resistance in the cost indicating arm of the bridge should differ from the resistance in the volume or weight arm of the cost bridge, the bridge would be out of balance and current would flow to the motor thereby to rotate the cost drum. Such rotation would continue until the resistance on the drum placed in circuit is equal to either the volume or weight resistances as the case may be, and at such time the bridge will be in balance and the motor will be de-energized, the drum having rotated to indicate the cost based on the volume or weight of the object.

Desirably the device is also equipped with suitable circuits to indicate the relation between the weight and the volume, that is, the density of the object being shipped. To this end, a bridge circuit is provided into which the volume and weight resistances may be switched to form two arms of such bridge. By means of a suitable indicating device connected across the bridge, preferably an electric meter having a center type scale, if the volume current predominates the needle of the meter will move in one direction and if the weight current predominates the needle of the meter will move in the opposite direction and such meter, in the illustrative embodiment herein, is calibrated to read "one" when the volume and weight are equal and greater or less than "one" when such currents differ.

This application is a continuation in part of copending applications Serial No. 217,934, now Patent No. 2,688,878, filed March 28, 1951; Serial No. 201,905, now Patent No. 2,708,368, filed December 21, 1950, and Serial No. 776,529, now Patent No. 2,630,043, filed September 27, 1947.

In the accompanying drawings in which are shown one or more of various possible embodiments of the several features of the invention, Fig. 1 is a perspective view partly in cross section of an illustrative equipment for rating objects, Fig. 2 is a front elevational view of the equipment shown in Fig. 1 on a larger scale with parts broken away, Fig. 3 is a sectional view taken along line 3—3 of Fig. 2 showing one of the indicating drums, Fig. 4 is a fragmentary sectional view taken along lines 4—4 of Fig. 2, Fig. 5 is a sectional view on a larger scale taken along line 5—5 of Fig. 4, Fig. 6 is a fragmentary detail view taken along line 6—6 of Fig. 4, Fig. 7 is a detail sectional view on a larger scale taken along line 7—7 of Fig. 1, Fig. 8 is an elaborate circuit diagram illustrating the application of the principle of the invention in a substantially commercial embodiment thereof, Fig. 9 is a fragmentary portion of the circuit of Fig. 8 showing the volume resistor banks and volume drum, and Fig. 10 is a fragmentary detail view of another contact making device.

Before proceeding to a description of the circuit, an equipment with which the invention may be practiced, will be briefly described.

The rating equipment will be described as suitable for rating by volume, objects up to a length of five units, height of five units and width of five units in increments of one unit, from two units up and for rating by weight objects up to five units in increments of one unit from one unit up. It is of course to be understood that the equipment could rate objects of much greater range of size or weight and the above simple example herein illustrates the principles of the invention. The units of length, width and height may be centimeters, meters, inches, feet, yards or any arbitrary unit of length as desired, and the units of weight may be grams, ounces or pounds, or any arbitrary unit of weight as desired.

In Fig. 1 is shown a rectangular housing 21 illustratively a box of any suitable material having an open top 22. Mounted on the floor 23 of the housing 21 as shown in Fig. 2, is a weighing scale 24 which may be of any suitable type, such as, for example, that put out by Pitney-Bowes Company and designated by the trade-mark "Postometer" and such weighing scale will only be described to the extent necessary for a clear understanding of the invention. As shown in Fig. 2, the weighing scale comprises a vertically movable support 27 controlled by a weight placed thereon to move the actuating arm 28 affixed on a transverse shaft 35 rotatavely mounted in suiting arm 28 carries a rack 33 which engages a pinion 34 affixed on a transverse shaft 35 rotatively mounted in suitable bearings 36 and 37, as shown in Fig. 4, at the free ends of fixed arms 38 and 39 respectively, extending obliquely upwardly from the bottom of the weighing scale 24. Mounted on shaft 35 is a drum 42 which desirably has axial hubs 43 on each of the end walls 44 and 45 thereof, said hubs being rigidly affixed to said transverse shaft 20 by means of set screws 46.

Affixed on the periphery of the drum 42 adjacent end wall 44 thereof, and extending radially outward therefrom, is a bracket 47, shown in Figs. 4 and 5, the free end of which carries a laterally extending wiper arm 48 mounting a roller 49 at the free end thereof. Associated with wiper arm 48 and engaged by roller 49 thereof is a contact ring 51 which, as shown in Figs. 4 and 5, desirably comprises a plurality of contact strips 52 affixed to and arcuately arranged on a plate 53 of insulating material affixed by spacer bolts 54 to arm 38, said plate 53 lying in a plane parallel to end wall 44 of drum 42 and being interposed between said end wall 44 and rack 33.

The wiper arm 48 is electrically connected through bracket 47 and conducting strip 55 on drum 42, extending longitudinally thereof, to annular slip ring 56 mounted on a plate 57 of insulating material affixed to end wall 45 of the drum. As shown in Figs. 4 and 6, slip ring 56 is engaged by roller 61 mounted at the end of wiper arm 62 affixed to and extending laterally outward from bracket 63 mounted on arm 39 and insulated therefrom.

Mounted on the vertical support 27 of the weighing scale is a frame 65 by means of which the dimensions of the object being rated can be measured. As shown in Figs. 1 and 2, the frame 65 desirably comprises a substantially rectangular platform 66, of dimensions slightly less than that of the open top 22 of the rectangular housing 21, an end wall 67 and a rear wall 68. The platform and said walls each desirably comprises a pair of spaced parallel plates 69 and 71 as shown in Fig. 1, the plate 69 of platform 66 which forms the floor of frame 65 being affixed to support 27 as by bolts 72 (Fig. 2).

In order to determine the length, width and height respectively of the object to be rated, the frame 65 desirably has a plurality of measuring members 73, 74 and 75 slidably mounted thereon adjacent the three axes of a three dimensional system of rectangular coordinates. To this end the plate 71 of platform 66 desirably has a transverse slot 76 therein adjacent the end edge 77 thereof, the plate 71 of wall 67 desirably has a vertical slot 78 therein adjacent the vertical edge 79 of the frame and the plate 71 of wall 68 desirably has a longitudinal slot 80 therein adjacent the lower edge 81 thereof.

The measuring members (Fig. 7) each desirably comprises a pair of blocks 82, 83 positioned respectively on each side of the associated slot and retained together by a screw 84. One of the blocks, i. e., block 82 is positioned on the outer surface of the associated plate 71 to define a finger to engage the object being measured and the other of said blocks, i. e., the block 83 which is on the inner side of the associated plate 71, has a projecting portion or rib 85 which extends into the slot to guide the measuring member therealong.

Although the measuring members as illustratively shown are manually movable along the associated slots, it is of course to be understood that they could normally be spring retained at the ends 86 of such slots and moved into engagement with the extremities of the object being measured by any suitable mechanical or electrical means which would be obvious to one skilled in the art.

Desirably the screw 84 of each of the measuring members also mounts an insulating strip 87 to the guide member 83 as shown in Fig. 7, the insulating strip carrying a wiper arm 88, which may engage the spaced contact strips 89 affixed on insulating strips 91 which extend parallel to each of the slots 76, 78 and 80. Desirably the affixed end of each of the wiper arms 88 is reversely bent as at 92 and each engages a contact rail 93, the latter being supported at its ends on the associated plate 71 and insulated therefrom. Each of the plates 71 desirably has an insulating panel 94 mounted on the inner face thereof which support the various resistances utilized in the operation of the equipment and which will be more fully described hereinafter.

With the construction above described, after the measuring members 73, 74 and 75 are moved to the ends 86 of the associated slots, if, for example, an object or package, is placed on platform 66 as shown in Fig. 1 with its corner at the origin "O" and engaging the end wall 67 and the rear wall 68 and the measuring members are moved along their associated slots so that the associated fingers 82 engage the end, side and top of the box, the wiper arm 88 controlled by each of the measuring members, will engage the associated contact strip 89 correlated with the longitudinal, transverse and vertical dimension of the object. In addition, the weight of the object on the platform 66 will affect the weighing scale, which is previously set at zero to compensate for the weight of the frame 65, so that the roller 49 of wiper arm 48 mounted on the drum 42 will engage the associated contact strip 52 on ring 51 correlated with the weight of the object.

The electrical circuits hereinafter described are controlled by the dimensions and by the weight of the object in order to determine the shipping charge or rating (whether according to volume or to weight) upon an indicating device, illustratively a drum 97 having its periphery 98 exposed through the front wall 99 of the housing 21 and which desirably has its periphery calibrated in monetary units such as in cents, automatically to register the charge or rating of the particular object.

If desired the housing may also have similar indicating drums 101 and 102 calibrated, for example, in cubic inches and pounds to indicate the volume and weight respectively of the object and an electric meter 103 desirably of the center scale type having a pointer normally at center position to indicate the ratio of the weight to the volume or the density of the object, said drums and meter also being exposed through the front panel 99 of the casing. The equipment may also have one or more additional control switches to introduce further factors that may be significant in determining the rating of the object. Thus, there is shown on housing 21 a manually operable control switch 104 designated the ratio switch, which serves to set up a predetermined relation between weight and volume in determining the rating. Moreover, there is shown a switch 105 designated the zone switch which serves to multiply the basic charge or rating by a predetermined factor illustratively in accordance with the postal or other zone to which the object is to be transported.

Thus the drum 97 will indicate the amount to be charged for transportation of an object placed on the equipment, such charge to depend usually on weight. But in all such cases where the volume is to be the controlling factor, such volume rather than the weight, shall control the drum reading, which reading automatically takes into account also the ratio factor determined by switch 104, and the zone factor determined by switch 105, all of which will appear more clearly from the following description of the electrical circuits.

Referring now to the circuit diagram shown in Figs. 8 and 9, three resistance banks designated RB–1, RB–2 and RB–3 are provided, each of value to effect a current flow proportional to the logarithm of the dimension being measured and which may be mounted respectively on insulating plates 94 on wall 68, platform 66 and wall 67 to measure length, width and height respectively, said resistance banks being connected in parallel thereby to provide a combined current flow which is proportional to the logarithm of the volume of any object being rated.

To form each of the resistance banks RB–1, RB–2 and RB–3, a resistance is connected at one end as at 111 (Figs. 8 and 9) to each of the contact strips 89 mounted on insulated strips 91, four resistances being illustratively shown in each bank although it is to be understood that any desired number could be used, the resistances in each bank which are mounted on the associated insulating panel 94 being designated RL–2 to RL–5 to determine length, RW–2 to RW–5 to determine width and RH–2 to RH–5 to determine height. The contact rails 93 which are engaged by the associated wiper arms 88 which ride on the contact strips 89 mounted on the insulating strips 91, are connected together by common lead 112 which is connected by lead 113 to movable contact arm 114 of volume relay 115, by leads 106 and 107 to movable contact arm 108 of discriminator relay 109 and by leads 106 and 110 to movable contact arm 120 of volume cost relay 100. Lead 112 is also connected by lead 116 to movable contact arm 117 of double pole single throw switch 118, which may be mounted on front panel 99 of the casing, fixed contact 119 of said switch being connected by lead 122 to one end of resistance 123 the other end of said resistance being connected by lead 124 to one end of resistance 125, which is substantially identical to resistance 123, and also by lead 126 to D. C. main 127. The other end of resistance 125 is connected by lead 128 to fixed contact 129 of switch 118, the meter 103 being connected across contacts 119 and 129 to indicate density in the manner hereinafter to be described. The ends 136 of resistance banks RB–1, RB–2 and RB–3 are connected by common lead 137 which is in turn connected by lead 138 to wiper arm 139 of volume indicating drum 101 and by lead 141 to D. C. main 142.

As shown in Figs. 3, 8 and 9, the volume indicating drum 101 mounts a plurality of contact strips 143, six of which are illustratively shown and which are so connected to a resistance 144 also desirably mounted on said drum that when the wiper arm 139 engages any one of said contact strips 143, a corresponding predetermined resistance will be placed in circuit. One end of the resistance 144 is connected to a contact ring 145 mounted on the drum 101 and insulated therefrom and such contact ring 145 is engaged by a wiper arm 146 connected by leads 147 and 148 to the movable arm 149 of volume relay 115 and by leads 147 and 152 to the movable arm 153 of volume zero relay 154.

Drum 101, as shown in Figs. 2 and 8 is operatively connected by shaft 157 to a servo-motor 158 which is controlled by means of a servo-amplifier 159, such as of the type put out by the Brown Instrument Division of the Minneapolis-Honeywell Regulator Co., the servo-motor and servo-amplifier being designated as the Brown Electronik "continuous balance," unit No. 354,574. The output of the servo-amplifier 159 is connected to servo-motor 158 by lead 161 and the power input to the servo-amplifier 159 is supplied by means of leads 162 and 163, which are connected respectively across alternating current mains 164 and 165. One of the input leads 166 to the servo-amplifier 159 is connected to one end of resistance 167 and is also connected by lead 168 to fixed contact 169 of volume relay 115 and by leads 168 and 172 to fixed contact 173 of volume zero relay 154. The other input lead 174 of the servo-amplifier 159 is connected to one end of resistance 175, which is identical in value to resistance 167, and is also connected by lead 176 to fixed contact 177 of volume relay 115 and by lead 178 to fixed contact 179 of volume zero relay 154.

The ends 183 of resistances 167, 175 are connected by common lead 184 and by lead 185 to D. C. main 127. Fixed contact 187 of volume relay 115 and movable contact arm 188 of volume zero relay 154 are connected together by lead 189 which in turn is connected by lead 191 to the servo-motor 158. Movable contact arm 192 of volume relay 115 and fixed contact 193 of volume zero relay 154 are connected by leads 194 and 195 respectively to A. C. main 165. One end of the coil 196 of volume relay 115 and the coil 197 of weight relay 198 is also connected to A. C. main 165.

In order to control the operation of the equipment in a predetermined timed sequence, a timer 199 is provided which, as shown in Fig. 8, desirably comprises a plurality of discs of conducting material designated 200, 201, 202, 203 and 204 all affixed on a shaft 205 also of conducting material which is driven by a motor 206 preferably of the alternating current type, one of the power inputs of which is connected to A. C. main 165.

Each disc has a wiper arm 207, 208, 209, 210 and 211 associated therewith respectively, and adapted to engage the periphery of the associated disc. The discs 200, 201, 202, and 203 have notches 212 of different lengths in their periphery in which the wiper arms are normally positioned to break the circuit from the wiper arm to the associated disc, and disc 204 is continuously engaged by its associated wiper arm 211 which is connected to A. C. main 164.

The wiper arm 208 is connected by leads 215, 214 and 213 to the other ends of coils 196 and 197 and the wiper arm 207 is connected by leads 217 and 218 to the other side of the power input of motor 206 and also is connected to the movable arm 219 of start switch 221, the fixed contact 222 of said switch being connected to A. C. main 164.

The movable contact arm 226 of volume zero relay 154 is connected by lead 227 to one end of zeroing resistance 228, the other end of which is connected by lead 229 to D. C. main 142. One end of the coil 231 of volume zero relay 154 is connected to A. C. main 165 and the other end of said coil is connected by leads 232 and 233 to movable contact arm 234 of zero switch 235, the fixed contact 236 of said switch being connected by lead 237 to A. C. main 164. Lead 233 is also connected by leads 238 and 239 to one side of the coils 241 and 242 of weight zero relay 243 and cost zero relay 244, the other side of coils 241 and 242 being connected to A. C. main 165.

The contact strips 52 on the weight scale 24, five of which are illustratively shown in Figs. 5 and 8, are desirably connected to a resistance 251 mounted on plate 53 in such manner that when the roller 49 of wiper arm 48 engages any one of said contact strips 52, a corresponding predetermined resistance will be placed in circuit. As shown in Fig. 8 the roller 49 on wiper arm 48 is connected by lead 252 to wiper arm 253 on weight indicating drum 102 and by lead 255 to D. C. main 142.

The wiper roller 61 of scale 24 which engages contact ring 56 connected to resistance 251, is connected by lead 256 to movable contact arm 257 of weight relay 198, by leads 256 and 258 to movable contact arm 259 of discriminator relay 109, by leads 256, 258, 261 to movable contact arm 262 of weight cost relay 263 and by lead 264 to the movable contact arm 265 of density switch 118.

The weight indicating drum 102 is substantially identical to volume indicating drum 101 and also mounts a plurality of contact strips 268, illustratively six in number, which are so connected to a resistance 269 that when the wiper arm 253 engages any one of said contact strips 268 a corresponding predetermined resistance will be placed in circuit.

One end of the resistance 269 is connected to a contact ring 270 mounted on the drum 102 and insulated therefrom and such contact ring 270 is engaged by a wiper arm 271 connected by lead 272 and 273 to the movable arm 274 of weight relay 198 and by lead 275 to the movable arm 276 of weight zero relay 243.

Drum 102 as shown in Figs. 2 and 8 is operatively connected by shaft 277 to a servo-motor 278 which is controlled by means of a servo-amplifier 279, the motor 278 and amplifier 279 being of the type previously described. The output of the servo-amplifier 279 is connected to servo-motor 278 by lead 281 and the power input to the servo-amplifier 279 is supplied by means of leads 282 and 283 which are connected respectively to alternating current mains 164 and 165.

One of the input leads 284 to the servo-amplifier 279 is connected to one end of resistance 285 and is also connected by lead 286 to fixed contact 287 of weight relay 198 and by leads 286 and 288 to fixed contact 289 of weight zero relay 243. The other input lead 291 of the servo-amplifier 279 is connected to one end of resistance 292, which is identical in value to resistance 285, and lead 291 is also connected by leads 293 and 294 to fixed contact 295 of weight relay 198, and by lead 293 and 296 to fixed contact 297 of weight zero relay 243. The ends 298 of resistances 285 and 292 are connected by common lead 299 and by lead 301 to D. C. main 127. Fixed contact 302 of weight relay 198 and fixed contact 303 of weight zero relay 243 are connected by lead 304 which is connected by lead 305 to A. C. main 165.

Movable contact 308 of weight relay 198 is connected by lead 309 to movable contact 311 of weight zero relay 243 which is connected by lead 312 to the servo-motor 278 to connect the latter through fixed contact 302 and lead 305 to A. C. line 165 to energize said motor. Movable contact arm 313 of weight zero relay 243 is connected by lead 314 to one end of zeroing resistance 315, the other end of which is connected by leads 316 and 317 to D. C. main 142 and by leads 316 and 318 to movable arm 319 of ratio switch 104.

Switch 104 controls resistance banks designated R$a$V and R$a$W which are mounted in housing 21 and the resistance banks are designed to introduce a factor in determining the rating in order to give a greater or lesser rating significance to the volume with respect to the weight than that for which the circuit is normally set.

The circuit herein is designed to place resistance banks R$a$V and R$a$W in parallel with the parallel connected resistance banks RB–1, RB–2 and RB–3 or resistance 251 of the weight scale. Each of these resistance banks R$a$V and R$a$W is normally out of circuit by reason of the normally open switch arm 319 associated therewith and each of the resistances of resistance banks R$a$V and R$a$W is of value such as to pass a current proportional to the logarithm of the factor which it is to introduce.

The resistance banks R$a$V and R$a$W each desirably comprises a plurality of resistances, only two of which are shown, resistances R$a$V–2 and R$a$V–3 being at the left and resistances R$a$W–2 and R$a$W–3 being at the right. The R$a$V resistances are connected by lead 322 and lead 323 to movable contact arm 324 of discriminator relay 109 while the R$a$W resistances are connected by leads 325 and 326 to the movable arm 327 of discriminator relay 109. The fixed contact 331 of relay 109 is connected by lead 331' to fixed contact 310 of relay 109, movable contact arm 310' being connected by lead 354 to one side of balancing resistance 321, the other side of which is connected by lead 441 to D. C. main 142. Contact 331 is also connected by lead 332 to fixed contact 333 of said relay and by lead 334 to one end of resistance 335 and also by lead 336 to the input of servo-amplifier 337. The fixed contact 338 of discriminator relay 109 is connected by lead 330 to fixed contact 355 of relay 263, the movable contact arm 459 being connected by lead 460 to one side of balancing resistance 450, the other side of which is connected by lead 450' to D. C. main 142. Fixed contact 338 is also connected by lead 339 to fixed contact 341 of said relay and by lead 342 to one end of resistance 343, which is identical in value to resistance 335, said resistance 343 being connected by lead 344 to the other input of servo-amplifier 337, said resistances 335 and 343 being connected to D. C. main 127 by leads 328 and 329.

The power input of servo-amplifier 337 is connected to A. C. mains 164, 165 by leads 356 and 357 and the output of the servo-amplifier 337 is connected by lead 345 to a servo-motor 346, amplifier 337 and motor 346 also being of the type previously described. The shaft of motor 346 carries a switch arm 347 which, upon rotation of the servo-motor 346 in a counterclockwise direction will actuate the movable arm 348 of volume cost switch 349 which is normally in open position. Arm 348 is connected by lead 351 to movable switch arms 350 and 350' of relay 340 and by lead 340' to lead 218. Fixed contact 360 of relay 340 is connected by lead 367 to one side of the coil 368 of volume cost relay 100 and also to movable arm 369 of said relay. The other side of coil 368 is connected to A. C. main 165. Desirably an indicating lamp such as a neon light 372' is connected across said coil 368 to indicate when the latter is energized. Fixed contact 360' of relay 340 is connected by lead 370 to lead 352. One end of the coil 353 of discriminator relay 109 is connected by lead 352 to wiper arm 209 of timer 199, the other end of said coil being connected to D. C. main 165. Fixed contact 363 of discriminatator relay 109 is connected by lead 364 to the servo-motor 346 to energize the latter when movable contact 365 of relay 109, which is connected to D. C. main 165 by lead 366, engages said fixed contact 363.

The fixed contact 362 of volume cost switch 349 is connected by lead 380 to one side of the coil 372 of relay 340, the other side of said coil being connected through leads 357' and 357 to D. C. main 165. The fixed contact 373 of volume cost relay 100 is connected by leads 374, 375 and 376 to one side of resistance 377 and by lead 376' to one side of the input of servo-amplifier 393. Fixed contact 373 is also connected by leads 374 and 378 to the fixed contact 379 of weight cost relay 263, by leads 374, 375, 381 and 382 to fixed contact 383 of cost zero relay 244 and by lead 384, which is connected to lead 381, to fixed contact 385 of zone relay 386. Fixed contact 387 of volume cost relay 100 is connected by leads 388 and 389 to one side of resistance 391 which is identical to resistance 377, and also by lead 392 to the other input of servo-amplifier 393. The other ends of resistances 377 and 391 are connected by leads 398 and 399 to D. C. main 127. Fixed contact 387 of relay 100 is also connected by leads 388 and 402 to fixed contact 403 of weight cost relay 263 and by leads 388 and 404 to fixed contact 405 of cost zero relay 244.

The power input to servo-amplifier 393 is connected by leads 406 and 407 to A. C. mains 165 and 164 and the output of the servo-amplifier 393 is connected by lead 408 to a servo-motor 409, amplifier 393 and motor 409 also being of the type previously described. The servo-motor 409 is also connected by leads 411 and 412 to fixed contact 413 of volume cost relay 100 and by leads 411 and 414 to the fixed contact 415 of weight cost relay 263, contact 415 being connected by lead 416 to fixed contact 417 of cost zero relay 244. Movable contact arm 421 of volume cost relay 100 is connected by leads 422 and 423 to movable contact arm 424 of weight cost relay 263 and by lead 425 to A. C. main 165 which is also connected by lead 426 to movable contact arm 427 of cost zero relay 244.

Movable contact arm 431 of volume cost relay 100 is connected by lead 432 to the wiper arm 433 of cost indicating drum 97, which is substantially identical to drums 101 and 102 and is driven by motor 409 through shaft 410. Drum 97 also desirably mounts a plurality of contact strips 436, illustratively six in number, which are so connected to a resistance 437 that when the wiper arm 439, which is connected by lead 441 to D. C. main 142, engages one of said contact strips 436, a predetermined resistance will be placed in circuit. One end of the resistance 437 is connected to a contact ring 438 mounted on the drum 97 and insulated therefrom and such contact ring 438 is engaged by said wiper arm 433 which is also connected by leads 432, 442 and 443 to movable contact arm 444 of weight cost relay 263 and by lead 445 to movable contact arm 446 of cost zero relay 244.

The fixed contact 451 of volume cost relay 100 is connected by leads 452, 340' and 217 to wiper arm 207 of timer 199. Wiper arm 210 of timer 199 is connected by leads 453, 454, 455 and 456 to one side of the coils 457, 458 of weight cost relay 263 and zone relay 386 respectively. The other side of coil 457 is connected by lead 461 to the fixed contact 462 of volume cost relay 100 and the other end of coil 458 is connected by lead 464 to A. C. main 165. Desirably a neon lamp 463 is placed across coil 457 to indicate when the latter is energized. The movable contact arm 465 of volume cost relay 100 is connected by lead 466 to A. C. main 165. The movable contact arm 468 of cost zero relay 244 is connected by lead 469 to one side of zeroing resistor 471, the other side of which is connected by lead 472 to D. C. main 142.

The movable contact arm 473 of zone relay 386 is connected by lead 474 to common lead 475 which connects one end of a plurality of resistances "Z" of zone switch 105, any one of which may be placed in circuit to multiply the cost indication by a predetermined multiple in order to give the direct reading for various zones. As shown in Fig. 8 the zoning switch 105 illustratively has three resistances designated Z-2, Z-3 and Z-4, the terminals 476 of which may be selectively engaged by the switch arm 477 which is connected by lead 478 to D. C. main 142.

DETERMINATION OF RESISTOR MAGNITUDES

Illustrative values will now be determined for the resistances of resistance banks RB-1, RB-2 and RB-3 on the assumption that a line voltage of 110 volts D. C. is utilized.

If the current passing through each of the resistance banks RB-1, RB-2 and RB3, for example, is proportional to the logarithm of the corresponding dimension classification, the sum of the currents through each of the resistance banks will be of such value that the anti-logarithm thereof will equal the product of the three dimensions or the volume classification of the object to be read as such on drum 101, or with corresponding monetary value on drum 97.

As appears in Tabulation I, hereinafter set forth, the second column is the logarithm (to two decimal places) of each of the dimensional values from 2 to 5 in the first column, which is headed "Classification." For convenience in calculations, the third column will be the logarithm multiplied by 100 and considered as milliamperes and the resistances, in the fourth column are readily determined from Ohm's law by dividing the impressed voltage of 110 by the current in milliamperes.

*Tabulation I*

| Classification | Logarithm | Current in Milliamperes | Resistance in Ohms required in Circuit |
|---|---|---|---|
| 2 | 0.30 | 30 | 3,666 |
| 3 | 0.48 | 48 | 2,292 |
| 4 | 0.60 | 60 | 1,833 |
| 5 | 0.70 | 70 | 1,571 |

With resistances having values thus determined, the total current flow through the parallel connected resistance banks RB-1, RB-2 and RB-3 will be proportional to the logarithm of the product of the dimensions, i. e., to the volume being measured. Thus, for example, if the unit of measurement is considered to be inches, if an object 2 inches by 2 inches by 2 inches is being measured, the combined value of the parallel connected resistance banks RB-1, RB-2 and RB-3 will be 1,222 ohms and the current flow therethrough will be 90 ma., which is proportional to the logarithm of the volume of the object. From a table of logarithms the anti-logarithm of .90 is read as 8, which is the corresponding product of the dimensions or the volume of the object that will be read as such on drum 101 or in corresponding monetary value upon the drum 97 which may be calibrated in cents in increments of five.

This resistance 144 is of such value that when said contact strips 143 are successively engaged by the wiper arm 139, resistance will be tapped off resistance 144 of value to pass a current proportional to the logarithm of a given numerical value. The first contact strip 143 is desirably connected to resistance 144 to tap off a resistance of value equal to that of zoning resistance 228 to give a zero indication or drum 101 in the manner hereinafter to be described. The second contact strip 143 will tap off a resistance of 1,222 ohms which will pass a current of 90 ma. which is proportional to the logarithm of eight. The third contact strip 143 will connect a resistance of 917 ohms in circuit to pass a current of 120 ma. which is proportional to the logarithm of 16 and so on.

Let it be assumed that 8 cubic inches of volume shall have the same rating as one pound of weight. Thus, to have a current flow in the weight resistance 251 of 90 ma. for one pound of weight, which is equivalent to a volume of 8 cubic inches, the value of the weight resistance 251 in circuit would have to be 1,222 ohms and for current flow of 120 ma., 138 ma., 150 ma., and 160 ma. which are equivalent to weights of 2, 3, 4 and 5 pounds, the value of the weight resistance in circuit would have to be 917, 797, 733 and 688 ohms respectively. To this end the contact strips 52 on drum 42 are connected to resistance 251 in such manner that when said contact strips 52 are successively engaged by the wiper roller 49 as drum 42 rotates due to the weight of an object on platform 66, resistances of the above value will be successively tapped off resistance 251.

To determine the value of resistance 269 on drum 102 to which the contact strips 268 are connected, this resistance is of such value that when said contact strips 268 are successively engaged by the wiper arm 253, resistance will be tapped off resistance 269 of value to pass a current equal to that passed by the resistor 251 when a contact strip 52, associated with a given weight is engaged by wiper roller 49 and the first contact strip 268 is desirably connected to resistance 269 to tap off a resistance of value equal to that of zeroing resistance 315 to give a zero indication on drum 102 also in the manner hereinafter to be described.

The resistance 437 on the cost drum 97 is of such value that assuming a charge of five cents is to be made for each pound of weight or each 8 cubic inches of volume, the value of the resistance 437 in circuit for a weight of one pound or 8 cubic inches must be 1,222 ohms to pass a current of 90 ma. For weights of two, three, four or five pounds and volumes of 16, 24, 32 or 40 cubic inches, the value of resistance 437 must be 917, 797, 733 and 688 ohms respectively as in the case of weight drum 24.

To this end, the contact strips 436 on drum 97 are so connected to resistance 437 that when said contact strips are successively engaged by the wiper arm 439, resistance will be tapped off resistance 437 of value to pass a current equal to that passed by either the parallel connected resistance banks RB–1, RB–2, RB–3 or the resistance 251 for volumes of 8, 16, 24, 32 or 40 cubic inches or weights of one, two, three, four or five pounds respectively. The first contact strip 436 of drum 97 is also desirably connected to resistance 437 to tap off a resistance of value equal to that of zeroing resistance 471 to give a zero indication on drum 97 also in the manner hereinafter to be described.

Where greater volume than the illustrative 8 cubic inches is to have a rating equal to one pound of weight as for example, when twice that volume or 16 cubic inches is to have the same rating as one pound, it is merely necessary to increase the current flowing to the end of resistance 343 to which the weight resistance 251 is connected. For this purpose, it is merely necessary to add resistance in parallel with the weight resistance 251, the value of which will produce a current which is proportional to the logarithm of two so that the current flow would be that caused by a weight of two pounds. From Tabulation I it appears that the required resistance $R_aW$–2 is 3,666 ohms which will increase the current flow to 120 ma. Similarly, if it is desired to change the ratio to 24 cubic inches to one pound, it is merely necessary to multiply by three and the value of resistance $R_aW$–3 to effect current flow proportional to the logarithm of three is 2,292 ohms.

Where a lesser volume than the illustrative 8 cubic inches is to have a rating equal to one pound of weight as, for example, where up to but not including twice the weight or two pounds is to have the same rating as eight cubic inches, it is merely necessary appropriately to increase the current flowing to resistance 335. This may be accomplished by adding resistance in parallel with the volume resistance banks RB–1, RB–2 and RB–3 to increase the current flowing to resistance 335 and the values of such resistances $R_aV$–2 and $R_aV$–3 are identical with the respective resistances $R_aW$–2 and $R_aW$–3, i. e., 3,666 ohms and 2,292 ohms respectively.

As previously pointed out, assuming the drum 97 is calibrated to read the charge or cost at the rate of five cents for every pound or for every 8 cubic inches, the drum 97 will rotate to indicate five, ten, fifteen, twenty or twenty-five cents when the object weighs one, two, three, four or five pounds or has a volume of 8, 16, 24, 32 or 40 cubic inches respectively.

If the charge to be made is based on zones and the basic charge for a one pound package of volume of 8 cubic inches or less in zone one is five cents, it may be doubled or trebled for zones 2 or 3 for example, by adding either the resistance Z–2 or Z–3 in parallel with the parallel connected resistance banks RB–1, RB–2 and RB–3 or with weight resistance 251 as the case may be, by movement of switch arm 477. The resistances Z–2 and Z–3 are of value to increase the current flow to the desired amount so that drum 97 will rotate to give a reading which is double or triple the basic reading, and such resistances may have a value of 3,666 ohms and 2,292 ohms respectively.

OPERATION

In order to determine the classification of an object including its volume, weight and density and the cost to be charged for shipping the same, the object or package is first placed on platform 66 adjacent the origin "O" of the three-dimensional system of rectangular coordinates and the measuring members 75, 73 and 74 are moved to engage the top, end and side of the package respectively.

Assuming for purposes of illustration that the package is two inches by two inches by two inches and weighs one pound, and the ratio switch 104 and zone switch 105 are in neutral position as shown in Fig. 8, movement of the measuring members 73, 74 and 75 will cause the wiper arms 88 to engage the contact strips 89 associated with resistances RL–2, RW–2 and RH–2 of resistance banks RB–1, RB–2 and RB–3 respectively (Figs. 8 and 9). The weight of the package on the platform 66 will cause the contact roller 49 on wiper arm 48 to engage a contact strip 52 which taps off a resistance correlated with a one pound weight, i. e., a resistance of 1,222 ohms.

When the frame 65 which is carried by the weighing scale, is at rest, the operator may actuate start switch 221 mounted on the front panel 99 of the housing 21 to bring movable contact arm 219 into engagement with fixed contact 222. As a result, a circuit will be completed to the timer motor 206 from A. C. main 164, fixed contact 222 which is engaged by movable arm 219, lead 218 to one side of the motor and from the other side of the motor to A. C. main 165.

Energization of motor 206 will, through shaft 205, rotate timer discs 200, 201, 202, 203 and 204 in a clockwise direction as shown in Fig. 8. After a short interval of time the notch 212 in disc 200 will move past wiper arm 207 which then engages the periphery of disc 200 to complete a holding circuit to the motor 206 so that when switch 221 is opened the motor 206 will remain energized. The holding circuit is from A. C. main 164, wiper arm 211, which continuously engages disc 204, conducting shaft 205, disc 200, wiper arm 207 engaging said disc, leads 217 and 218 to one side of the input of motor 206 and thence to A. C. main 165.

Further rotation of the shaft 205 by motor 206 will cause the notch 212 in disc 201 to move past wiper arm 208 which then engages the periphery of disc 201. As a result, a circuit will be completed to the coils 196 and 197 of volume relay 115 and weight relay 198 respectively. This circuit is from A. C. main 164, wiper arm 211, disc 204, conducting shaft 205, disc 201, wiper arm 208, leads 215 and 214 to one side of coil 196 and lead 213 to one side of coil 197, the other sides of said coils being connected to A. C. main 165.

Energization of the coil 196 of volume relay 115 will bring movable contact arms 114, 149 and 192 thereof into engagement with fixed contacts 177, 169, and 187 respectively. As a result, a circuit will be completed from D. C. main 142, leads 141 and 138 to wiper arm 139 which is engaging one of the contacts 143 on drum 101 and from said D. C. main 142 and lead 141 to common lead 137 which connects one end of each of the resistances RL–2, RW–2 and RH–2. The other ends of said resistances are connected by common lead 112 and lead 113 to movable arm 114 which engages fixed contact 177, the latter being connected by lead 176 to one side of resistance 175.

A circuit will also be completed from wiper arm 146, which engages contact ring 145 of drum 101, leads 147, 148 to movable arm 149 of relay 115 which engages fixed contact 169, and from contact 169 by way of lead 168 to one side of resistance 167. As the other sides of resistances 167 and 175 are connected by common lead 184 and by lead 185 to D. C. main 127, it is apparent that the resistances 167 and 175, the parallel connected resistances RL–2, RW–2 and RH–2 and resistance 144 on drum 101 will form a Wheatstone bridge, designated the volume bridge, the output of which is fed through leads 166 and 174 to servo-amplifier 159.

As has been previously pointed out, with a package having dimensions of two inches by two inches by two inches and a volume of 8 cubic inches, the combined resistance value of the three-parallel connected resistances RL–2, RW–2 and RH–2 will be 1,222 ohms. If the value of the drum resistance 144 in circuit is greater or less than 1,222 ohms, it is apparent that the volume bridge above described will not be in balance and current will flow through leads 166 and 174 into the servo-amplifier 159. This current will be amplified and fed to servomotor 158 to energize the latter, and motor 158, through shaft 157, will rotate volume drum 101. The drum 101 will rotate until wiper arm 139 thereof engages a contact strip 143 associated with a resistance of 1,222 ohms, at which time the volume bridge will be in balance and no current will flow into the servo-amplifier 159. Consequently, servo-motor 158 will be de-energized and the drum 101 will stop rotating. The drum is so calibrated that when it has thus stopped rotating, a suitable pointer will indicate a value of 8 cubic inches which is correlated with the resistance of 1,222 ohms.

Energization of weight relay 198 which, as we have seen occurs simultaneously with energization of volume relay 115, will bring movable contact arms 257, 274 and 308 into engagement with fixed contacts 295, 287 and 302 respectively. As a result, a circuit will be completed from D. C. main 142, lead 255 to wiper arm 253 which is engaging one of the contact strips 268 on weight drum 102 and from said D. C. main 142 and leads 255 and 252 to wiper arm roller 49. As a weight of one pound is on the scale 24 the drum 42 will have rotated so that a contact strip 52 associated with a resistance of 1,222 ohms is engaged by wiper arm roller 49. The wiper arm 61 of scale 24 is connected by lead 256 to movable contact arm 257 which is now engaging fixed contact 295 and such fixed contact is connected by leads 294 and 293 to one side of the resistance 292.

The wiper arm 271 which is engaging contact ring 270 on drum 102, to which one end of resistance 269 is connected, is connected by leads 272, 273 to movable contact arm 274 which is engaging fixed contact 287, and such contact 287 is connected by lead 286 to one side of resistance 285. As the other sides of resistances 285 and 292 are connected by common lead 299 and by lead 301 to D. C. main 127, it is apparent that the resistances 285 and 292, the weight resistance 251 and the weight drum resistance 269 will also form a Wheatstone bridge, designated the weight bridge, the output of which is connected through leads 284 and 291 to servo-amplifier 279.

As has been previously pointed out, with a package weighing one pound, the resistance value of resistance 251 on the scale 24 will be 1,222 ohms. If the value of the drum resistance 269 in circuit, is greater or less than 1,222 ohms, it is apparent that the weight bridge above described will not be in balance and current will flow through leads 284 and 291 into servo-amplifier 279. This current will be amplified and fed to servo-motor 278 to energize the latter and motor 278 through shaft 277 will rotate weight drum 102. The drum 102 will rotate until wiper arm 253 thereof engages a contact strip 268 associated with the resistance of 1,222 ohms, at which time the weight bridge will be in balance and no current will flow into the servo-amplifier 279. Consequently, servo-motor 278 will be de-energized and the drum 102 will stop rotating. The drum is so calibrated that when it has thus stopped rotating, a suitable pointer will indicate a value of one pound which is correlated with the resistance of 1,222 ohms.

At this time the circuit has operated to give a reading of volume and weight on drums 101 and 102 respectively.

Continued rotation of shaft 205 by motor 206 in a clockwise direction, as shown in Fig. 8, will cause the notch 212 in disc 201 to reach wiper arm 208 and break the circuit to the coils 196 and 197 of volume relay 115 and weight relay 198 respectively. De-energization of such relays will cause the movable contact arms thereof to move away from the associated fixed contacts to break the circuit from resistances RL-2, RW-2 and RH-2 and from resistance 251 to the resistances 167, 175 and 285, 292 of the volume and weight bridges respectively. As a result of the moving of arm 192 of relay 115 away from fixed contact 187 and of arm 308 of relay 198 away from fixed contact 302, the circuit from A. C. main 165 to the servo-motors 158 and 278 respectively will be broken. Consequently, there is no likelihood of "creeping" of said servo-motors due to stray currents in the circuit which would change the readings on the associated drums 101 and 102.

Substantially simultaneously with the de-energization of relays 115 and 198, the notch 212 in disc 202 will move past wiper arm 209 which then engages the periphery of disc 202. As a result, a circuit will be completed from A. C. main 164, wiper arm 211, disc 204, conducting shaft 205, disc 202, wiper arm 209, lead 352, to one side of coil 353 of discriminator relay 109 and from the other side of said coil to A. C. main 165 thereby energizing coil 353. Energization of coil 353 of discriminator relay 109 will bring movable contact arms 108, 259, 365, 324 and 327 thereof into engagement with fixed contacts 331, 338, 363, 333 and 341 respectively.

Movement of contact 108 of relay 109 against fixed contact 331 will connect one side of the parallel connected volume resistance banks RB-1, RB-2 and RB-3 through common lead 112, leads 106, 107, movable arm 108, fixed contact 331, leads 332 and 334 to resistance 335. Movement of arm 259 of relay 109 against fixed contact 338 will connect one side of weight resistance 251 on scale 24 through leads 256 and 258, movable arm 259, fixed contact 338, leads 339 and 342 to resistance 343.

As resistance banks RB-1, RB-2 and RB-3 are connected by lead 141 to D. C. main 142, and as resistance 251 is connected to D. C. main 142 by leads 252, 255 and as the resistances 335, 343 have their other ends connected by leads 328 and 329 to D. C. main 127, the resistances 335, 343, resistance banks RB-1, RB-2, RB-3 and resistance 251 will form a Wheatstone bridge designated the discriminator bridge, the output of which is connected through leads 336 and 344 to servo-amplifier 337.

As the resistance of the volume resistance banks RB-1, RB-2 and RB-3 and the weight resistance 251 are both equal to 1,222 ohms as above described, inasmuch as the object has a volume of 8 cubic inches and weighs one pound, the discriminator bridge will be in balance and hence no current will flow into the servo-motor 346 which will remain de-energized. Consequently, the switch 349 will remain open as the switch arm 347 of servo-motor 346 will not engage movable contact arm 348 of said switch to bring the latter into engagement with the fixed contact 362.

As a result, the volume cost relay 100 will remain de-energized when the discriminator bridge is balanced for no current will flow through coil 368 of said relay. Under these conditions the movable contact arms 310', 120, 431, 421 and 369 of relay 100 will remain spaced from the associated fixed contacts 310, 373, 387, 413 and 451 and the movable contact arm 465 will remain in engagement with fixed contact 462.

Simultaneously with the energization of the discriminator coil 353 by the movement of the disc 202, the notch 212 in disc 203 will move past the wiper arm 210, which then engages the periphery of disc 203. As a result, a circuit will be completed to coil 457 of the weight cost relay 263. This circuit is from A. C. main 164, wiper arm 211, which engages disc 204, conducting shaft 205, disc 203, wiper arm 210, leads 453, 454, 455 through coil 457, lead 461, fixed contact 462 of cost relay 100, contact arm 465 engaging the latter and lead 466 to A. C. main 165. Energization of the coil 457 of weight cost relay 263 will bring movable contact arms 262, 444, 424 and 459 thereof into engagement with fixed contacts 379, 403, 415 and 355 respectively.

Movement of contact 262 of relay 263 against fixed contact 379 will connect weight resistance 251 to one end of resistance 377, the circuit being from resistance 251 of scale 24, leads 256, 258 and 261, contact 262, which engages fixed contact 379, leads 378, 375 and 376 to said resistance 377. Movement of arm 444 of relay 263 against fixed contact 403 will complete a circuit from drum resistance 437, through wiper arm 433, leads 432, 442, 443, arm 444, fixed contact 403, leads 402 and 389 to resistance 391. As the weight resistance 251 is connected to D. C. main 142 by way of leads 255 and 252; as drum resistance 437 is connected to D. C. main 142 by way of lead 441, and as resistances 377 and 391 are connected by leads 398 and 399 to D. C. main 127, resistances 377 and 391, weight resistance 251 and drum resistance 437 will form another Wheatstone bridge, designated the cost bridge, the output of which is fed through leads 376' and 392 into servo-amplifier 393.

As the package has a weight of one pound, the value of resistance 251 of scale 24 in circuit is 1,222 ohms. If the value of the drum resistance 437 in circuit is greater or less than 1,222 ohms, it is apparent that the cost bridge above described will not be in balance and current will flow through leads 376' and 392 into the servo-amplifier 393. This current will be amplified and fed to servo-motor 409 to energize the latter and through shaft 410 will rotate cost drum 97. The drum 97 will rotate until wiper arm 439 thereof engages a contact strip associated with a resistance of 1,222 ohms at which time the cost bridge will be in balance and no current will flow into the servo-amplifier 393. Consequently, servo-motor 409 will be de-energized and the drum 97 will stop rotating. The drum is so calibrated that when it has thus stopped rotating, a suitable pointer will indicate a cost of five cents which is the charge for one pound which is correlated with the resistance of 1,222 ohms.

Continued rotation of shaft 205 by motor 206 in a clockwise direction will cause the notch in disc 203 to reach wiper arm 210, to break the circuit to the coil 457 of weight cost relay 263 to de-energize such relay. As a result, the circuit from weight resistance 251 to cost bridge resistance 377 will be broken as will be the circuit from drum resistance 437 to bridge resistance 391. In addition, the movement of arm 424 away from fixed contact 415 will break the circuit from A. C. main 165 to servo-motor 409 to avoid any possible "creeping" of the latter which would vary the cost reading.

After the disc 200 has made substantially a complete revolution, the notch 212 therein will reach the wiper arm 207 to break the circuit to motor 206 and the equipment will thereupon be rendered inoperative with the drums 101, 102 and 97 indicating the volume, weight and cost of the package.

If the package should have a volume of 8 cubic inches and the weight should be, for example, two pounds, the system would function in the manner previously described so that the drum 101 would rotate to indicate a volume of 8 cubic inches and the drum 102 would rotate to indicate a weight of two pounds. As the current through weight resistance 251, which would have a value of 917 ohms for a weight of two pounds, is greater than that through the parallel connected resistance banks RB–1, RB–2 and RB–3, which have a combined value of 1,222 ohms for a volume of 8 cubic inches, the discriminator bridge would be unbalanced and current will flow into the servo-amplifier 337. Due to the fact that the weight current will be greater than that of the volume current, the servo-motor 346 will be rotated in a clockwise direction so that the switch arm 347 thereof will have no effect on the movable arm 348 of switch 349. As a result, the volume cost relay coil 368 will remain de-energized and the weight cost relay coil 457 will be energized as previously described so that the weight resistance 251 will form one of the arms of the cost bridge also as previously described. Consequently, the drum 97 will rotate until wiper arm 439 engages a contact strip associated with a resistance of 917 ohms to balance the cost bridge at which time a cost indication of ten cents will be indicated by drum 97.

If the object being measured should be two inches by two inches by four inches or sixteen cubic inches and the weight should be one pound, the drums 101 and 102 would indicate the volume of sixteen cubic inches and a weight of one pound respectively as previously described. When the volume resistance banks RB–1, RB–2 and RB–3, which have a value of 917 ohms for a volume of sixteen cubic inches, and the weight resistance 251 which has a value of 1,222 ohms for a weight of one pound, are placed in the discriminator bridge as previously described, the current through the volume resistances would be greater than that through the weight resistance, i. e., 120 ma. to 90 ma. Consequently, the discriminator bridge would be unbalanced, but this time the current into the servo-amplifier 337 would be in direction to rotate the servo-motor 346 in a counterclockwise direction and switch arm 347 would engage contact arm 348 to move the latter into engagement with fixed contact 362.

As a result, a circuit will be completed from A. C. main 165, leads 357, 357', coil 372 of relay 340, lead 380, closed contacts 362 and 348, leads 351, 340', 218, 217, wiper arm 207 which is engaging disc 200, shaft 205, disc 204, wiper arm 211 to A. C. main 164. Energization of coil 372 will bring movable contact arms 350 and 350' into engagement with fixed contacts 360 and 360' respectively.

Engagement of contacts 350 and 360 will complete a circuit from A. C. main 164, wiper arm 211, disc 204, conducting shaft 205, disc 200, wiper arm 207, leads 217, 218, 340', contacts 350, 360, lead 367 to coil 368 of volume cost relay 100 to A. C. main 165. Energization of coil 368 will bring movable contact arms 310', 120, 431, 421 and 369 thereof into engagement with fixed contacts 310, 373, 387, 413 and 451 respectively and will move movable arm 465 away from fixed contact 462 so that no current will flow through coil 457 of weight cost relay 263. Movement of arm 120 against fixed contact 373 will complete a circuit from volume resistances RB–1, RB–2 and RB–3, leads 106, 110, contact arm 120, fixed contact 373, leads 374, 375, 376 to one side of resistance 377. Movement of arm 431 against fixed contact 387 will complete a circuit from drum resistance 437, wiper arm 433, lead 432, arm 431, fixed contact 387, leads 388, 389 to one side of resistance 391. As a result, the volume resistance banks RB–1, RB–2 and RB–3, drum resistance 437 and resistances 377 and 391 will now form the cost bridge and if the value of resistance 437 differs from that of resistance banks RB–1, RB–2 and RB–3, which have a combined value of 917 ohms, the cost bridge will be out of balance and current will be fed to servo-amplifier 393. As a result, motor 409 will be energized to rotate the drum 97 until wiper arm 439 engages a contact strip associated with a resistance of 917 ohms. At this time the cost bridge will be in balance, the motor 409 will no longer be energized and the drum 97 will stop rotating at a point to indicate a cost of ten cents correlated with the volume of sixteen cubic inches.

The movement of contact arm 310' of volume cost relay 100 against fixed contact 310 or of contact arm 459 of weight cost relay 263 against fixed contact 355 as the case may be, will connect either resistance 321 or 450 in the discriminator bridge circuit in place of either the volume resistance banks RB–1, RB–2 and RB–3 or the weight resistance 251, whichever has been switched to the cost bridge circuit in the manner previously described.

Thus in the event that the discriminator relay 109 should still be energized after either the weight or volume cost relay is energized, a resistor 321 or 450 of value less than any combined value of the volume resistance banks RB–1, RB–2 and RB–3 or the weight resistance bank 251 will be in the discriminator circuit. Consequently the discriminator bridge will be unbalanced and current will flow into servo-amplifier 337.

If the weight cost relay has been previously energized, resistance 450 will be in the discriminator circuit and the servo-motor 346 will rotate in a clockwise direction so that switch arm 347 will have no affect on contact arm 348. If the volume cost relay has been previously energized, resistance 321 will be in the discriminator circuit and the servo-motor 346 will rotate in a clockwise direction so that switch arm 347 will move contact arm 348 in engagement with contact 362.

If not for the resistances 321 and 450, in the event the discriminator relay should still be energized after either the volume resistance banks or the weight resistance has shifted to the cost bridge, the removal of such resistance would leave the discriminator bridge completely unbalanced in favor of either weight or volume respectively. As a result, even though, for example, volume should be the controlling factor, the weight resistance left in the discriminator bridge would cause the weight cost relay to be energized and similarly if weight should be the controlling factor the volume resistances left in the discriminator bridge would cause the volume cost relay to be energized. Such malfunction of the equipment is eliminated by the switching of either the resistance 321 or 450 into the discriminator bridge to retain the latter unbalanced in the desired direction.

If the notch 212 in disc 202 should move into alignment with wiper arm 209 while arm 347 is engaging arm 348 and retaining the latter against fixed contact 362, although the circuit to discriminator relay 109 would be broken, the volume cost relay would be connected in circuit so that upon the next weighing and measuring operation the volume relay would be energized regardless of whether volume or weight was to be the controlling factor. To prevent this erroneous reading the movable contact arm 350' and fixed contact 360' are provided. When arm 350' and contact 360' are engaged, even if notch 212 in disc 202 is aligned with wiper arm 209, a circuit will still be completed to discriminator relay coil 353 so that the motor 346 will remain energized until arm 347 no longer engages arm 348. When this occurs, the circuit to coil 372 will be broken and contact arms 350, 350' will move away from contacts 360, 360' to break the circuit to discriminator relay coil 353 and volume cost relay coil 368.

In order to determine the density or the relation of weight to volume, of the package being shipped, it is merely necessary for the operator to close switch 118. This will connect volume resistance banks RB–1, RB–2 and RB–3 through lead 116 and movable arm 117 of density switch 118 to fixed contact 119 and resistance 123. The weight resistance 251 will be connected through lead 264 and movable arm 265 of said switch to fixed contact 129 and resistance 125. As a result, a Wheatstone bridge, designated the density bridge will be formed, the output of which will be the difference between the weight current and the volume current and such output will be indicated on meter 103, as a factor of density.

If the currents through the weight and volume resistances should be identical, the density bridge would be in balance and under these conditions the meter is illustratively designed to give an arbitrary indication of "one" which would indicate that the weight and the volume bear a predetermined relation to each other, i. e., eight cubic inches to one pound. If, for example, the weight current should be greater than the volume current, the meter will give an indication of a density greater than "one" and if the volume current should be greater than the weight current, the meter would give an indication of a density of less than "one."

The operation thus far described has been with respect to the predetermined relation of eight cubic inches to one pound with a charge of five cents for each eight cubic inches or each pound. Where it is desired to allow the shipper to transport double the volume for a given weight for the same price, that is, sixteen cubic inches for five cents, before start switch 221 is closed, it is merely necessary for the operator to move switch arm 319 so that it engages the contact associated with resistance $RaW-2$ which has a value of 3,666 ohms. This will place such resistance in parallel with the weight resistance 251 when the latter is switched into the discriminator bridge circuit as previously described.

Thus, for example, if the volume is sixteen cubic inches and the weight is one pound, the current through resistance banks RB–1, RB–2 and RB–3 and resistance 335 of the discriminator bridge as previously pointed out, will be 120 ma. and the current through weight resistance 251 to resistance 343 of the discriminator bridge will be 90 ma. Resistance $RaW-2$ will be in parallel with weight resistance 251 which has a value of 1,222 ohms so that the total resistance will be 917 ohms and 120 ma. will also flow through resistance 343.

The parallel circuit for resistance $RaW-2$ is from weight resistance 251, leads 256, 258, contacts 259, 338 of discriminator relay 109, leads 339 and 342 to resistance 343 and from D. C. main 142, to which the other end of weight resistor 251 is connected, leads 317 and 318, movable arm 319, resistance $RaW-2$, lead 326, contacts 327, 341 of relay 109, lead 342 to resistance 343.

As a result, the discriminator bridge will remain balanced when the volume of the object is sixteen cubic inches and its weight is one pound. With the bridge in balance as previously pointed out, the weight resistance will be connected to the cost bridge and the cost drum 97 will rotate until it places a resistance in circuit having a value of 1,222 ohms which will give an indication of five cents.

If the volume should be greater than sixteen cubic inches such as, for example, twenty-four cubic inches and the weight still should be one pound, with the ratio switch 319 still engaging the contact associated with resistance $RaW-2$, 138 ma. (Tabulation I) will flow through resistance 343 thereby unbalancing the bridge in the manner previously described so that the resistance banks RB–1, RB–2 and RB–3 will be placed in the cost bridge and the cost drum 97 will rotate to give an indication of fifteen cents which is related to a volume of twenty-four cubic inches.

Similarly, if it is desired to allow the shipper to transport up to but not including double the weight for a given volume for the same price, that is, up to but not including two pounds for five cents, with a relation such as eight cubic inches to two pounds between volume and weight, it is a simple matter for the operator to move movable contact arm 319 of ratio switch 104 to engage the fixed contact associated with resistance $RaV-2$ to place the latter in parallel with the volume resistance banks RB–1, RB–2 and RB–3. The circuit is from volume resistances RB–1, RB–2 and RB–3, leads 106, 107, contacts 108, 331 of discriminator relay 109, leads 332 and 334 to resistance 335 and from D. C. main 142 to which the other end of the volume resistance banks RB–1, RB–2, RB–3 are connected, through leads 317, 318, contact arm 319, resistance $RaV-2$, lead 323, contacts 324, 333 of discriminator relay 109, lead 334 to resistance 335.

The addition of resistance $RaV-2$, which has a value of 3,666 ohms, in parallel with the resistance of parallel connected resistor banks RB–1, RB–2, RB–3 which have a combined value of 1,222 ohms will give a resultant resistance of 917 ohms so that 120 ma. will flow through resistance 335 of the discriminator bridge to overcome the 90 ma. flowing through resistance 343 of the bridge due to a weight of over one pound but less than two pounds on the scale 24. As a result, the servo-amplifier 337 will be energized to energize servo-motor 346 in direction to close switch 349. Consequently, the volume resistances RB–1, RB–2 and RB–3 will be placed in the cost bridge circuit so that the drum 97 will rotate to give an indication of five cents which is correlated with a current flow of 90 ma. or eight cubic inches and such charge will be given even though the weight of the object is, for example, 1.9 pounds.

In the event, however, an object being rated should have a relation between volume and weight equal to or greater than eight cubic inches to two pounds, the discriminator bridge will be balanced when the relation is equal to eight to two or unbalanced in favor of weight when the relation is changed, i. e., to eight to three. In either case the weight resistance 251 will be placed in the cost bridge circuit as previously described and the cost drum 97 will indicate ten or fifteen cents as the case may be, based on the weight of the object.

With the zoning switch 105 in the position shown in Fig. 8, the current flowing into the cost bridge will depend solely upon the current flowing through either the volume resistance banks RB-1, RB-2, RB-3 or the weight resistance 251 whichever is in circuit. If, for example, the weight resistance is in circuit and a weight of one pound is producing a current of 90 ma. the cost drum 97 will rotate to give an indication of five cents. If it is desired to double the rate in the event that the package is to be shipped to a second zone further away, it is a relatively simple matter to move switch arm 477 of the zone switch to engage the contact associated with resistance Z-2 so that the latter will be put in parallel with weight resistance 251. This circuit is from D. C. main 142 to which one end of resistance 251 is also connected through lead 478, arm 477, resistance Z-2, leads 475, 474, contacts 473 and 385 which are in engagement due to the energization of coil 458 of relay 386 when wiper arm 210 engaged disc 203, lead 384, 381 and 376 to resistance 377 to which the other end of weight resistance 251 is connected.

As resistance Z-2 has a value of 3,666 ohms, and resistance 251 has a value of 1,222 ohms, the resultant resistance will be 917 ohms so that 120 ma. will flow into the cost bridge and the drum 97 will rotate until the bridge is balanced and a charge of ten cents will be indicated by the drum. Similarly the charge may be multiplied by 3, 4 or other factors as desired.

In order to reset the drums 101, 102 and 97 to zero position (which is not required for continuous operation of the equipment), it is merely necessary to press zero switch 235. As a result, a circuit will be completed to the coils 231, 241 and 242 of the volume zero relay 154, the weight zero relay 243 and the cost zero relay 244. This circuit is from A. C. main 164, lead 237 through switch contacts 236, 234, leads 233, 232 through coil 231 to A. C. main 165. Similarly, the coils 241 and 242 which are in parallel with coil 231 will be energized. As a result, the movable contact arms of the relays 154, 243 and 244 will engage the associated fixed contacts. Referring to volume zero relay 154, when contact arm 226 engages fixed contact 179, a circuit will be completed from D. C. main 142, lead 229, zeroing resistance 228, lead 227, contacts 226 and 179, lead 178 to volume bridge resistance 175. The movement of contact arm 153 against fixed contact 173 will complete a circuit from volume drum resistance 144, leads 147 and 152, contacts 153 and 173, leads 172, 168 to volume bridge resistor 167.

The zeroing resistance 228 is of such value that it will create an unbalance in the volume bridge until the drum 101 has been rotated by the servo-motor 158 in the manner previously described, to place in circuit the portion of resistance 144 that has a value equal to that of resistance 228 and when such resistance is in circuit, the drum 101 will indicate zero position. The closing of contacts 188, 193 of volume zero relay 154 completes a circuit to the servomotor 158 from A. C. main 165 so that such motor may be energized. As the operation of the weight zero relay 243, the cost zero relay 244 and the associated resistances 315 and 417 are identical to that of volume zero relay 154 and resistor 228, they will not be described.

After the drums 101, 102 and 97 have rotated to zero position the operator need merely move his finger from the zero switch 235 and the equipment is ready for the next package to be rated.

The equipment herein described will give indications of volume and weight on drums 101 and 102, cost on drum 97 and density on meter 103 and will enable the cost to be based on a predetermined ratio between volume and weight as well as permitting such cost to be multiplied by a given amount depending upon the zone to which the object is to be shipped.

However, it is to be understood that various combinations of such equipment could be used to indicate, for example, cost alone, with or without the ratio and zone factors, the density alone, or with the volume or weight indication and so forth.

Although the Wheatstone bridges utilized in the equipment have been described as being balanced when the resistance in the indicating arms of the volume, weight and the cost bridges are equal respectively to the resistance in the volume or weight arms as the case may be, it is of course to be understood that the bridges could be made to balance when the resistance in the two arms of the bridge bear a definite ratio to each other and the claims are intended to cover this concept.

The claims are also intended to cover equipment in which drums are not used but in which the motors drive selector arms to tap off resistance of different values having a linear scale associated therewith. As the construction of such equipment would be readily apparent to one skilled in the art in view of the disclosures herein, it will not be further described.

Although the equipment hereindescribed is illustratively shown as utilizing contact strips on the various drums to which resistances of predetermined value are connected, it is of course to be understood that a continuous length of resistance wire could be used on the drums and the associated wiper arms could tap off predetermined values of resistance from such continuous length of wire and the claims are intended to cover such construction.

If desired, instead of a wiper arm 42 engaging the contact strips 52 on drum 47, a solenoid 480 could be provided as shown in Fig. 10 and such solenoid could be energized, for example, when the periphery of disc 200 engaged wiper arm 207 to cause the armature 481 of the solenoid to engage the adjacent contact strip 52 to complete the desired circuit. The use of this construction would eliminate any friction against the contacts 52 while the drum is rotated and might be desirable, for example, when an extremely sensitive scale was utilized.

As many changes could be made in the above construction and method, and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. Equipment for rating objects according to volume, comprising circuit control means responsive to the respective dimensions of an object being rated, a resistance bank under control of each of the respective control means and each of magnitude to pass a current proportional to the logarithm of the corresponding dimension of such object, said resistance banks being connected in parallel to pass a combined current proportional to the logarithm of the volume of such object, an indicating device having a resistance bank associated therewith, means to pass a current through the resistance bank for said indicating device, means to tap off resistances of progressively different values from said indicating device resistance bank, the value of each of such tapped off resistances being such as to pass a current proportional to the logarithm of a given volume, and means responsive to the currents in the parallel connected resistance banks and said indicating device resistance bank to actuate said tapping means in order to select a resistance from said indicating device resistance bank equal in value to that of said parallel connected resistance banks related to a given volume, said indicating device having a volume calibration thereon associated with said tapped off resistance from said second resistance bank to indicate the volume of such object.

2. Equipment for rating objects, comprising circuit control means responsive to the respective dimensions of an object being rated, a resistance bank under control of each of the respective control means and each of magnitude to pass a current proportional to the logarithm of the corresponding dimension of such object, said resistance banks being connected in parallel to pass a combined current proportional to the logarithm of the volume of such object, a weighing scale, circuit control means responsive to the weight of such object, a resistance bank under control of the latter control means, means to pass a current through said weight resistance bank, said parallel connected resistance banks and said weight resistance bank being correlated so that for corresponding sequences of numerical values of volume and weight, the currents passed by said resistance banks are equal, a rating indicating device having a resistance bank associated therewith, means to pass a current through the resistance bank for said indicating device, means to tap off resistances of progressively different values from said last named resistance bank, the value of each of said tapped off resistances being such as to pass currents equal to that passed by either said volume resistance banks or said weight resistance bank for the sequence of numerical values of volume or weight, discriminator means responsive to the relative currents in said volume resistance banks and said weight resistance banks selectively to pass a current equal to that through either the volume or weight resistance banks, and means responsive to the currents in said selected resistance bank and the indicating device resistance bank to actuate said tapping means to select a resistance from said indicating resistance bank equal in value to that in said selected resistance bank related to a given volume or weight, said indicating device having a rating calibration thereon associated with said tapped off resistance from said indicating device resistance bank to indicate the rating of the object.

3. The combination set forth in claim 2 in which additional resistance is provided of value such as to pass a current proportional to the logarithm of a multiplier, and switch means selectively connects such resistance in parallel with either the volume controlled resistance banks or the weight controlled resistance bank.

4. The combination set forth in claim 2 in which additional resistances are provided associated respectively with said parallel connected volume controlled resistance banks and said weight controlled resistance bank, said additional resistances each being of value to pass a current proportional to the logarithm of a multiplier, and switch means selectively to connect any of said resistances in parallel with the associated volume or weight resistance banks.

5. The combination set forth in claim 2 in which an indicating device is associated with said parallel connected resistance banks, said indicating device having a resistance bank associated therewith, means to pass a current through said resistance bank, means to tap off resistances of progressively different values from said indicating device resistance bank, the value of each of said tapped off resistances being such as to pass currents proportional respectively to the logarithm of a given volume, means responsive to the currents in the parallel connected resistance banks and said indicating device resistance bank to actuate said tapping means in order to select a value of resistance from said indicating device resistance bank equal in value to that of said parallel connected resistance banks related to a given volume, said indicating device having a volume calibration thereon associated with said tapped off resistance from said indicating device resistance bank to indicate the volume of such object.

6. The combination set forth in claim 2 in which an indicating device is associated with each of said parallel connected volume resistance banks and said weight resistance bank, and switch means are provided to connect said volume resistance banks and said weight resistance bank to the associated indicating device and thereupon to disconnect said indicating devices and to switch said parallel connected resistance banks and said weight resistance banks to said discriminator means for selection of one of said resistance banks and to switch said selected resistance bank to the means responsive to the currents in said selected resistance bank and said rating indicating device resistance bank.

7. The combination set forth in claim 2 in which an indicating device is associated with each of said parallel connected volume resistance banks and said weight resistance bank, each of said indicating devices having a resistance bank associated therewith, switch means to connect said volume resistance banks and one of said indicating device resistance banks in one bridge circuit, and said weight resistance banks and the other of said indicating device resistance banks in a second bridge circuit, said indicating devices being actuated by unbalance in the associated bridge circuit to effect a reading of volume and weight respectively, additional switch means to disconnect said volume resistance banks and said weight resistance bank from the associated indicating device and to connect said resistance banks to said discriminator means for selection of either said volume resistance banks or said weight resistance banks and to switch said selected resistance bank to the means responsive to the currents in said selected resistance bank and said rating indicating device resistance bank.

8. The combination set forth in claim 2 in which the means responsive to the currents in the selected resistance bank and said rating indicating device resistance bank comprise a bridge circuit, one arm of which is the rating indicating device resistance bank, a second arm of which is the selected resistance bank and the means to tap off resistances of progressively different value to pass a current equal to that passed by said selected resistance bank is controlled by unbalance in said bridge.

9. The combination set forth in claim 2 in which the volume controlled and weight controlled resistance banks are correlated in a discriminator circuit and said discriminator circuit selects either the volume or weight current, depending upon which predominates in said discriminator circuit.

10. The combination set forth in claim 2 in which switch means are provided to switch said parallel connected volume resistance banks and said weight resistance bank to said discriminator, means for selection of one of said resistance banks and simultaneously to switch said selected resistance bank to the means responsive to the currents in said selected resistance bank and said rating indicating device resistance bank and to switch a balancing resistance in said discriminator means in place of said selected resistance bank, said balancing resistance being of ohmic value less than that of the resistance bank remaining in the discriminator means.

11. The combination set forth in claim 9 in which the discriminator circuit is a Wheatstone bridge, one arm of which is the volume controlled resistance banks, a second arm of which is the weight controlled resistance bank and a switch actuated by unbalance in said arms serves to select the currents through one of said re- 12. Equipment for rating objects, comprising circuit control means responsive to the respective dimensions of an object being rated, current limiting means under control of the respective control means and each of magnitude to pass a current proportional to the logarithm of the corresponding dimension of such object, said current limiting means being connected in parallel to pass a combined current proportional to the logarithm of the volume of such object, a weighing scale, circuit control means responsive to the weight of such object, current limiting means under control of the latter control means, said two current limiting means being correlated so that for corresponding sequence of numerical values of volume and weight the currents passed by the respective current limiting means are equal, a current responsive indicating device having linear scale markings thereon correlated respectively with each of the currents for each given numerical value, means responsive to the relative currents in the respective current limiting means, selectively to pass to said indicating device a current equal to that through one or the other of said current limiting means and means controlled by the current responsive indicating device and the selected current limiting means to actuate said indicating device.

13. Equipment for determining the density of a rectangular object which comprises current limiting means under the control of the three edges near one corner of the object to be rated and each of magnitude to pass a current proportional to the logarithm of the corresponding dimension, such current limiting means being connected in parallel to pass a combined current proportional to the logarithm of the volume of such object, a weighing scale, current limiting means associated with said scale, circuit control means for said current limiting means responsive to the weight of such object and of magnitude to pass a current proportional to the logarithm of such weight, means responsive to the relative currents in the respective current limiting means to pass a current which is related to the difference between the currents in said current limiting means, and an electric indicating device actuated by such current and calibrated to indicate such current as a factor of density.

14. The combination set forth in claim 13 in which the current limiting means are resistances, the parallel connected resistances that determine the volume constitute one arm of a Wheatstone bridge, the resistance that determines weight constituting a second arm of said bridge, the electric indicating device comprises an electric meter connected across the output of said bridge, said meter having a pointer normally at center position when said meter is de-energized whereby if said currents are equal, said bridge will be in balance and said meter will not be energized, and if said currents are not equal, said bridge will be unbalanced and the pointer will move to the left or to the right of center depending upon which of the currents is greater.

15. Equipment for rating objects comprising circuit control means responsive to the respective dimensions of an object being rated, an impedance bank under control of each of the respective control means and each designed to provide a plurality of electrical values, each proportional to a corresponding dimension of such object, means connecting said impedance banks to provide a combined electrical value proportional to the volume of such object, a weighing scale, circuit control means responsive to the weight of such object, an impedance bank under control of the latter control means, means to pass a current through said weight impedance bank and said impedance banks under control of the respective dimensions of the object, said last mentioned impedance banks and said weight impedance bank being correlated so that for corresponding sequences of numerical values of volume and weight, the electrical values provided by each of said two groups of impedance banks will be equal, a rating indicating device having an impedance bank associated therewith, means to pass a current through the impedance bank for said indicating device, means to adjust the effective value of said indicating device impedance bank so that it is proportional to the electrical value provided by either said connected impedance banks or said weight impedance bank for the sequence of numerical values of volume or weight, discriminator means responsive to the electrical values of said connected impedance banks and said weight impedance bank selectively to provide an electrical value equal to that of the connected impedance banks or weight impedance bank and means responsive to the value of said selected impedance bank and the indicating device impedance bank to actuate said adjusting means in order to select an electrical value from said indicating device impedance bank proportional to that of the selected impedance bank related to a given volume or weight, said indicating device having a rating calibration thereon associated with said indicating device impedance bank to indicate the rating of the object related to the selected value of said indicating device resistance bank.

References Cited in the file of this patent

UNITED STATES PATENTS

| | | |
|---|---|---|
| 1,560,046 | Dye | Nov. 3, 1925 |
| 1,573,850 | Naiman | Feb. 23, 1926 |
| 1,853,198 | Breaden | Apr. 12, 1932 |
| 2,108,146 | Simpson | Feb. 15, 1938 |
| 2,244,369 | Martin | June 3, 1941 |
| 2,271,508 | Gordon | Jan. 27, 1942 |
| 2,571,161 | Poole | Oct. 16, 1951 |
| 2,584,897 | Marco | Feb. 5, 1952 |